(12) United States Patent
Mueller et al.

(10) Patent No.: US 11,340,912 B2
(45) Date of Patent: May 24, 2022

(54) ADDITIVE INDEPENDENT OBJECT MODIFICATION

(71) Applicant: BMC SOFTWARE, INC., Houston, TX (US)

(72) Inventors: Douglas Mueller, Palo Alto, CA (US); Charles Mousseau, Palo Alto, CA (US)

(73) Assignee: BMC Software, Inc., Houston, TX (US)

( * ) Notice: Subject to any disclaimer, the term of this patent is extended or adjusted under 35 U.S.C. 154(b) by 5 days.

(21) Appl. No.: 15/476,609

(22) Filed: Mar. 31, 2017

(65) Prior Publication Data

US 2017/0206098 A1    Jul. 20, 2017

Related U.S. Application Data

(63) Continuation of application No. 13/732,292, filed on Dec. 31, 2012, now Pat. No. 9,645,833.

(51) Int. Cl.
*G06F 9/445* (2018.01)
*G06F 8/71* (2018.01)

(52) U.S. Cl.
CPC ............ *G06F 9/44505* (2013.01); *G06F 8/71* (2013.01)

(58) Field of Classification Search
CPC ................................ G06F 8/71; G06F 9/44505
See application file for complete search history.

(56) References Cited

U.S. PATENT DOCUMENTS

| | | | |
|---|---|---|---|
| 2005/0203975 A1* | 9/2005 | Jindal | G06F 8/38 |
| 2006/0015863 A1* | 1/2006 | Vaidyanathan | G06F 9/451 |
| | | | 717/170 |
| 2007/0180386 A1 | 8/2007 | Ballard et al. | |
| 2008/0126938 A1* | 5/2008 | Fleishman | G06F 9/451 |
| | | | 715/721 |
| 2010/0281458 A1* | 11/2010 | Paladino | G06F 8/71 |
| | | | 717/106 |
| 2011/0239190 A1* | 9/2011 | Mueller | G06F 16/245 |
| | | | 717/121 |
| 2011/0252334 A1* | 10/2011 | Verma | G06Q 30/06 |
| | | | 715/744 |

* cited by examiner

*Primary Examiner* — Wei Y Zhen
*Assistant Examiner* — Amir Soltanzadeh
(74) *Attorney, Agent, or Firm* — Brake Hughes Bellermann LLP

(57) ABSTRACT

Disclosed is a method, a system and a computer readable medium for additive independent object modification. The method includes determining an association between an independent object modification and a base object of a software application, modifying at least one element of the base object based on the associated independent object modification, and configuring the software application to execute in a computer system using the modified base object.

19 Claims, 13 Drawing Sheets

| Key | Application_ID | Object_ID | Object_Modification_ID | Group | Access | Information | |
|---|---|---|---|---|---|---|---|
| | | | | | | | ~900 |
| | | | | | | | |
| | | | | | | | |
| | | | | | | | |

ADDITIVE INDEPENDENT OBJECT MODIFICATION

RELATED APPLICATION

This application is a continuation application of U.S. application Ser. No. 13/732,292, filed Dec. 31, 2012, entitled "Additive Independent Object Modification", the contents of which is incorporated herein by reference.

BACKGROUND

Field

This disclosure relates generally to the field of computer programming. More particularly, but not by way of limitation, it relates to a technique for customizing software applications.

Related Art

Typically a customer acquires a software package from a vendor or receives a software package from another organization and uses the software package within the customer's environment. Often, making some number of changes to the software to change the operation or functionality of the software to meet the needs of the customer's environment better or to add additional functionality to cover additional needs for the customer is desirable. These changes may be to the logic, structures, data definition or capability, or any other alteration in the functionality of the software package solution.

However, a revision or patch or new release of the software package from the supplier may be required or desired. As a result, the customer is left with the issue that the product has changed from the original definition. How can the customer tell what they have changed and what the vendor has changed? How can the customer apply an update to get the fixes and additional functionality of the new version from the supplier but still preserve the customer's customizations? In general, this may be present a difficult problem to the customer. Usually, the solution has been a requirement to redo the customizations on the new release.

Another problem has been a need to have several different sets of customizations of a single environment to satisfy different constituencies using the software package in a shared environment. Each of these constituencies may want to independently (and often in conflict) modify the solution for their specific operation.

This is another difficult problem, usually solved by having independent implementations for the each group, which makes sharing of data difficult and makes the environment more complex.

A number of technologies have attempted solving portions of the problem identified above, but the solutions either do not allow for the continuing inheritance of changes to the software package while also reapplying changes made by the customer or independent customizations being simultaneously used or allow any aspect of the system to be independent of any other. Some of these attempted partial solutions include Shared Libraries/DLLs, Cascading Style Sheets (CSS), and object overlays.

Shared Libraries/DLLs allow for providing alternate definitions, but only for limited aspects of the application that have been predefined. There is no ability to layer definitions, definitions are simply replaced. And, when a definition is replaced by the DLL, no change to the underlying definition will be seen or inherited for the replacement definitions.

CSS allow for the definition of display properties for constructs in the system. They support hierarchical and parallel definition. They do not allow for changing of the fundamental construct definitions of the application but only for display options and characteristics of the objects within the definition. CSS allows reapplication of a definition. However, CSS is not a solution, because CSS does not allow the user to customize the logic or constructs of the system.

Applying an object overlay specifies an alteration to some component or object of the application, preserving the original definition and utilizing the original definition with the overlay definition as part of the definition of the system. Updates provided by the vendor for the component or object are applied to the original definition and are hidden by the object overlay. Therefore, overlaid objects are not updated even if there are changes to the component or object that are not aspects of the object definition that were overlaid. In other words, the changes of the overlay are fixed and are not reapplied to the updated vendor object definition.

Customization of an application frequently involves adding new functionality to existing functionality; for instance, an object may include a default list of groups of people that are allowed to access the object and the modification could be the addition of another group to the list. Customization may also involve subtracting functionality from existing functionality; for instance, the modification may be the removal of a group from the list. When the application is upgraded, it is often desirable that the same change be made to the new version of the application. If during the upgrade of the application the default list of groups with access is changed, the desirable result is the new default list with the same new group being added or removed. This requires that the change be reapplied after the application is altered. As a result, in the known art, changes made to the application must be tracked and recorded independent of the application. After the application is upgraded, the changes must be reapplied to the updated application definition.

SUMMARY

One embodiment includes a method for additive independent object modification. The method includes determining an association between an independent object modification and a base object of a software application, modifying at least one element of the base object based on the associated independent object modification, and configuring the software application to execute in a computer system using the modified base object.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
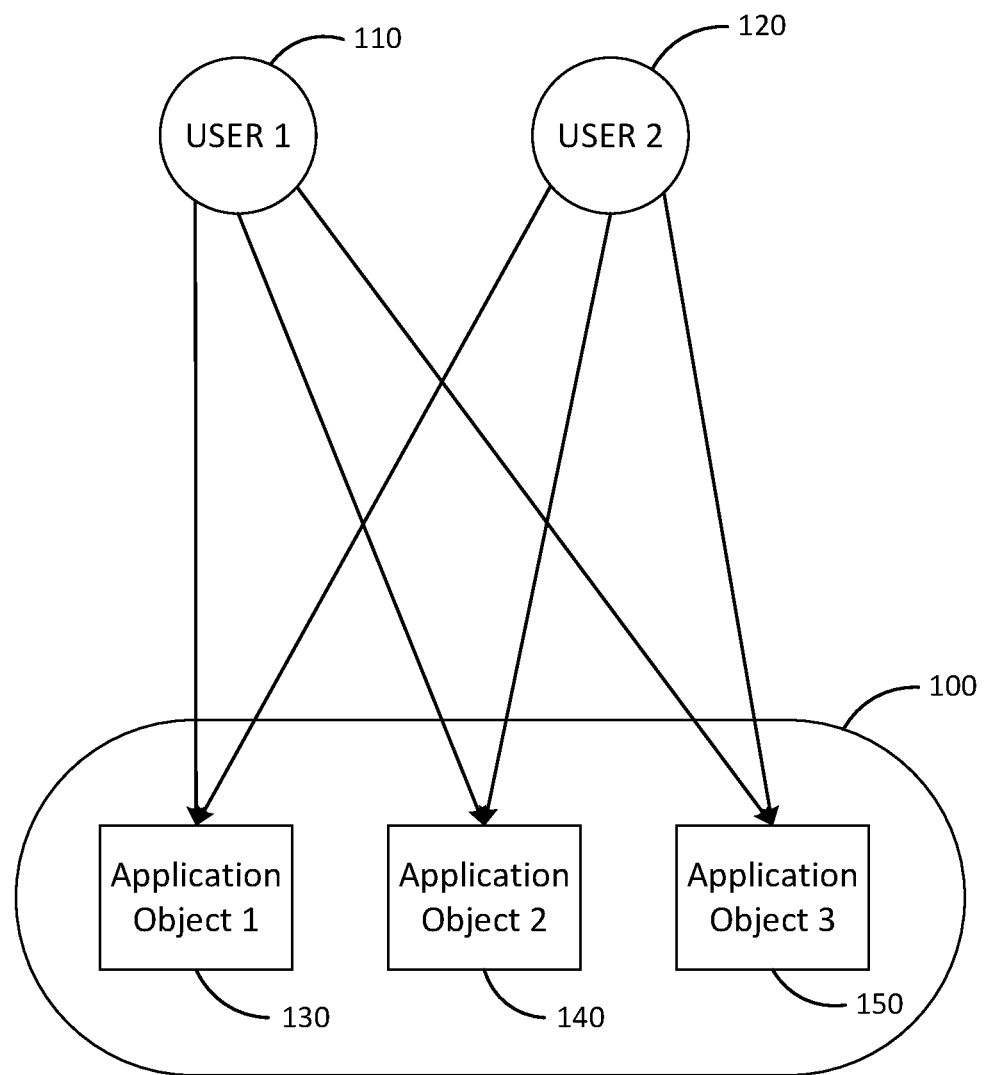
FIG. 1 illustrates, in block diagram form, an example of an application according to conventional art.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

According to example embodiments, if a customization specifies that a change is additive or subtractive to the existing definition of an application's behavior, the change is applied to the definition and is automatically reapplied to any changed version of the definition. If the changed version of the definition includes elements affected by the change (e.g., if a new group is now a member of a default list of groups) then, in an example embodiment, only the elements of the change not present in the definition are applied.

As a result, there is no need to track changes or to compare new and old definitions of the application or to reapply the changes. Therefore, the aforementioned problem may be solved not by replacing logic, but instead by extending the definition while continuing to inherit any changes that are made to the original definition. This is different from the general concept of just adding a new object or of replacing an existing object. Adding a new object does not have any connection to any object in the original definition so any changes to the original definition cannot be reflected in the new object. Replacing an object creates an alternate version of the object as a result any changes to the original definition will not be reflected in the replaced object.

Example embodiments hold the altered definition separately and may inherit any changes to the original definition, effectively reapplying the changes to the original definition after any modification. Therefore, the resulting object(s) reflect both the changes to the original definition and the changes that have been defined for the object(s). For example, an object may have permissions as part of the objects definition. Applying permission to two additional groups of users to an object, regardless of any other permission on the object may be desirable. Any updates made to newer versions of the object, including any permission updates, may also be desirable. Therefore, in example embodiments, the resulting object may be the latest version of the original object plus the changes (to the permissions) made to the object.

If a change is specified as additive or subtractive to the existing definition, the change may stored separately from the definition to which the definition is applied and may be dynamically applied to the definition whenever the definition is used. If the definition is modified, according to example embodiments, the change may still be applied to the modified definition. If the definition and the change specify the same behavior, then portions of the change that are not the same as the definition may be applied. For example, example embodiments may extend the objects permission list, adding the two additional permission assignments while making no other changes to the object. If the original or base object is updated, the changes made to the original definition as well as those in my extended definition may be applied to the object.

As a result, owners of an application may modify the applications' behavior once and may have the changes reapplied as the application is changed without having to compare old and new behaviors of the application and without modifying their changes to remain compatible with the new behaviors.

Various example embodiments disclosed herein recite techniques for allowing customization of an application with independent modification of application objects that allow preservation of the unmodified application, as well as the modified application. The independent modification of application objects allows a single instance of an application to be used by different users with different customizations, including use without any customizations.

Various embodiments disclosed herein recite methods for making changes that are separate from but related to the original definition and are loosely connected so that objects can change on either side without affecting the other side of the definition. This method should allow for multiple, independent chains of changes that have configurations for which users are using which sets of changes.

Various embodiments disclose a solution to the problem described above which are based on the concept of using independent modification of element definitions of application objects to specify an alteration to some component or object of the application, preserving the original definition and the object element modification as part of the definition of the system, but applying the object element modification to the execution path while suppressing the elements of the original definition associated with the object element modifications. As a result, the object functions as originally defined with the exception of those elements of the object which have been modified. In other words, the modification is additive (or subtractive) with regard to the original definition and does not replace the entirety of the original definition. Hereinafter the aforementioned concept is referred to as independent object modification.

Various embodiments may allow the customer to make additions to, changes to, or even deletions from the source definition by applying independent object modification(s) to any logic or data definition or other construct within the system. At run time or compile time, depending on whether the application runs in an interpreted or compiled environment, the definitions may be resolved through the independent object modification(s) with any definition in the independent object modification being used instead of the original source definition and the source definition being used when there is no modified definition.

This model allows an update from the source of the application to supply updates that change the source definition to be applied without worrying about the independent object modification(s). The entire set of customizations may be preserved within the independent object modification. After the update of the source application, all changes may still be present and linked to the appropriate object within the application.

By gathering the independent object modification(s) into groups, multiple different independent object modification(s) may be defined for the same construct or multiple different levels of independent object modification(s) may be used with each independent object modification(s) reading through to the independent modification below it until the original definition is reached.

The independent object modification groups may also be created parallel to each other to allow the definition of multiple, independent customizations of the definition. In such an embodiment, users may be assigned or allowed to select which independent object modification group they may use and the set of definitions from that independent object modification group (and any object in the chain below them) may be used. In one embodiment, users may be assigned to or allowed to select multiple independent object modification groups. In such an embodiment, precedence relationships may be defined between the multiple independent object modification groups. Thus, an application environment may be provided where there may be different customized functionality for different users.

In further embodiments, security may be applied to these independent object modification groups to control who can and cannot see or use the independent object modification(s) within the group. This allows the security to determine whether a user can or cannot see or use the independent object modification group and so the independent object modification definitions within it.

In still further embodiments, object modifications may be time dependent (e.g., include a time period constraint). For example, a modification may (or may not) apply during typical high use time periods (e.g., during normal business hours). A modification may (or may not) apply during longer time periods (e.g., days, weeks or months).

By changing the definition of which independent object modification(s) definition is used, the version of the application that runs (original, partially modified, fully modified) may be changed.

Before customization, the application from the application provider or vendor may be installed. Users may have access to the constructs and objects that define the application and run the application as it is designed and configured from the source. All users may use the same definition constructs that define the application and control the applications operation.

Objects within the context of this disclosure may refer to substantially permanent aspects of an application as opposed to the dynamic information that is controlled by the substantially permanent aspects. For example, an object may be a form in a compiled environment or a webpage in an interpreted environment. An object may be a dropdown list or a textbox associated with a form or a webpage. An object may be a table, a query, a trigger, a function and/or code within the database. An object may be a function and/or code associated with a form or webpage. Typically an object is not variable data. For example, an object may not be data in a record of a database table or an entry in a textbox on a form or a webpage. Objects may typically be defined and not be programmed (in the sense of a programming language).

Object definitions typically include an object and one or more attributes or characteristics that may define how the object functions, who can access the object, where the object is found and the like. Modifications to the objects may change or add a characteristic and/or attribute of the form or webpage. For example, a permission, access to an object, where the object is called from, a default value, a length, a color and the like for a dropdown list or a textbox may be added or changed. A permission for a table, a query, and/or a trigger may be added or changed. A permission to a column or field of a table may be added or changed.

FIGS. 1-6 are block diagrams that illustrate the customization concept implemented by the various embodiments disclosed below, with two users and an application with three application objects are shown (but not limited thereto). The number of users and the number of application objects are illustrative and by way of example only, and the disclosed techniques may be used with any number of users and any number of application objects.

FIG. 1 illustrates an unmodified application 100 with three application objects 130, 140, and 150 according to the conventional art. Each of the two users 110 and 120 may execute application 100, using all three application objects 130, 140, and 150. In conventional techniques, if user 110 wanted to customize application 100 differently than user 120, different copies of application 100 are created and separately customized. The unmodified application 100 is therefore unavailable to user 110 unless a separate copy of the unmodified application 100 is preserved. This may result in many permutations or copies of application 100, making management of the application 100 more difficult. Furthermore, if the vendor of application 100 updates the application 100, then all permutations would need to be re-created (and possibly modified).

Once the original application is in place, the customer may desire to make a change to the application. This change may be something that was not planned by the application provider or vendor, thus the customer wants to customize the application to add or modify the functionality of the application.

The changes may be implemented as a set of rules. For example, the rules may be configured to modify characteristics or attributes of an object of the application. For example, the rules may change (or add or subtract) permissions or default values associated with the characteristics or attributes. The rules may be stored separately from the application. For example, the rules may be stored in a separate and independent database. Alternatively, or in addition to, the database may store a pointer to a list of rules. The rules may be applied to an original (or previously modified) object. The rules may continue to be applied following one or more upgrades to the original application.

According to example embodiments, the rules may be applied in parallel (e.g., across a single level of modifications). The rules may be applied in series or sequentially (e.g., across hierarchical application of rule levels). The rules may have applied permissions (e.g., users who may implement the modification).

In Various embodiments the rules may be time dependent. For example, the rules may be applied such that a modification applies during typical high use time periods (e.g., during normal business hours). For example, the rules may be applied over longer time periods (e.g., days, weeks or months). As one skilled in the art will appreciate, the opposite time period may be applied. For example, the rules may not be applied during a typical high use time period.

Various embodiments allow making customizations to constructs in a parallel space to the application. The customizations may be made by supplying a modified definition for elements associated with objects of the construct. Any construct may have a parallel construct provided and any number of constructs may be provided with a modified definition for elements associated with objects of the construct. In other words, independent object modification(s) may be utilized to supersede one or more elements associated with original objects of the application.

The original definition remains unchanged and customizations may be recorded in these parallel definitions. At any time, the customer may use the original definition or the independent object modification(s).

In one embodiment, at run time for interpreted environments or at compile time for compiled environments, every construct may be checked to see if there is an independent object modification(s). If so, the independent object modification(s) may be used to modify the original definition. If not, the original definition may be used without modification. Thus, a set of constructs may be created that define the application and its operation with the customer's customizations included.

Time control rules may include rules that apply a modification only during certain time (or not during a certain time). Location rules include rules that apply a modification only when in a certain location (e.g., where the user or the application is executed). Context rules include rules that apply a modification only under a certain context. The information column may include the abovementioned rules for modifying the object and/or a pointer to the rules.

Figure 2:
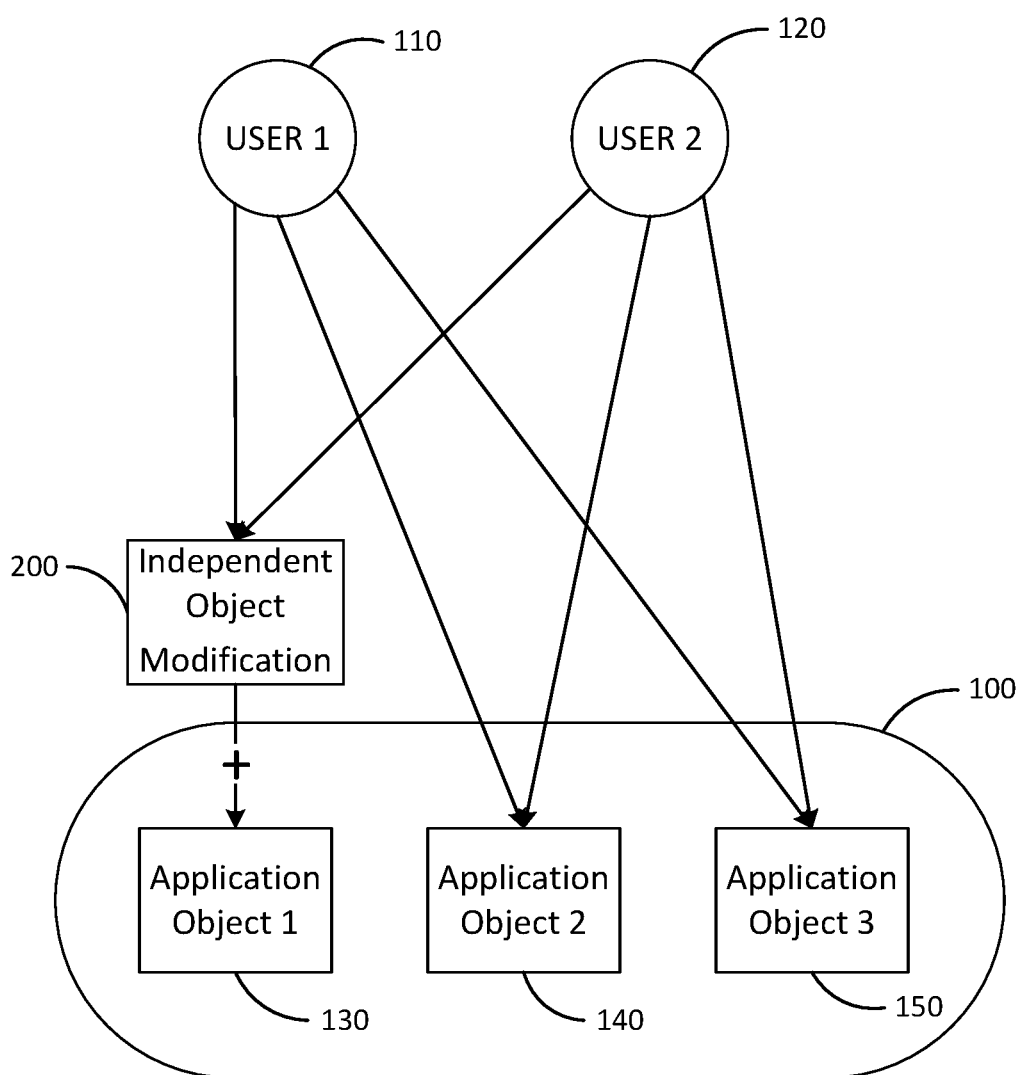
FIG. 2 illustrates, in block diagram form, an embodiment of an application employing an independent object modification.

FIG. 2 illustrates an example of independent object modification according to an example embodiment. In this example, object 130 of the application 100 is modified by independent object modification 200. Both users 110 and 120 may use application 100 with independent object modification 200 modifying original application object 130 when executing application 100. Application 100 may be modified by the vendor without affecting independent object modification 200, and users 110 and 120 may continue to use customized application 100 with independent object modification 200 even after an update by the vendor to application 100 modifies the application object 130.

Further, independent object modifications may modify a construct of an application such that original construct functionality is altered. There is no constraint over the scope of the construct. For example, the modification may be a part of a procedure, instead of a complete procedure.

An independent object modification may modify an existing element without any requirement to modify other related elements. For example, a DLL must replace all procedures in that DLL even if the customer wants to change only one part of one of the procedures. Further, object overlays replace an entire object even if the customer wants to change only one part or portion of the object overlay. Using independent object modification, a customer may modify only a specific element or characteristic of an object without modifying and while maintaining (e.g., utilizing) other elements or characteristics of the object.

Any object may be modified without the requirement that the application was structured to pre-define clusters of things that can be changed. For example, a customer may change any portion of an object of the application without the application having to be structured to isolate specific operations to allow them to be changed. As a result, independent object modification allows the modification to carry through to subsequent modifications of the original object (application).

By using independent object modifications for customizations, the process of upgrading or patching the application when getting a new or updated definition from the application provider or vendor may be dramatically simplified. The new definitions may simply be installed since all customizations are stored separately from the original source definitions. The customer need not be concerned with overwriting a customization or of making the requirement that customizations have to be made again. At the same time, the customizations may remain tied to the original definitions, so that the customized changes will still be in place, in the right location, and performing the same function as before the upgrade of the application from the application provider or vendor.

The disclosed techniques do not remove the base application object 130 from application 100. Thus, if desired, the application 100 may be executed without the independent object modification 200 without the need to preserve multiple versions of the application 100.

Figure 3:
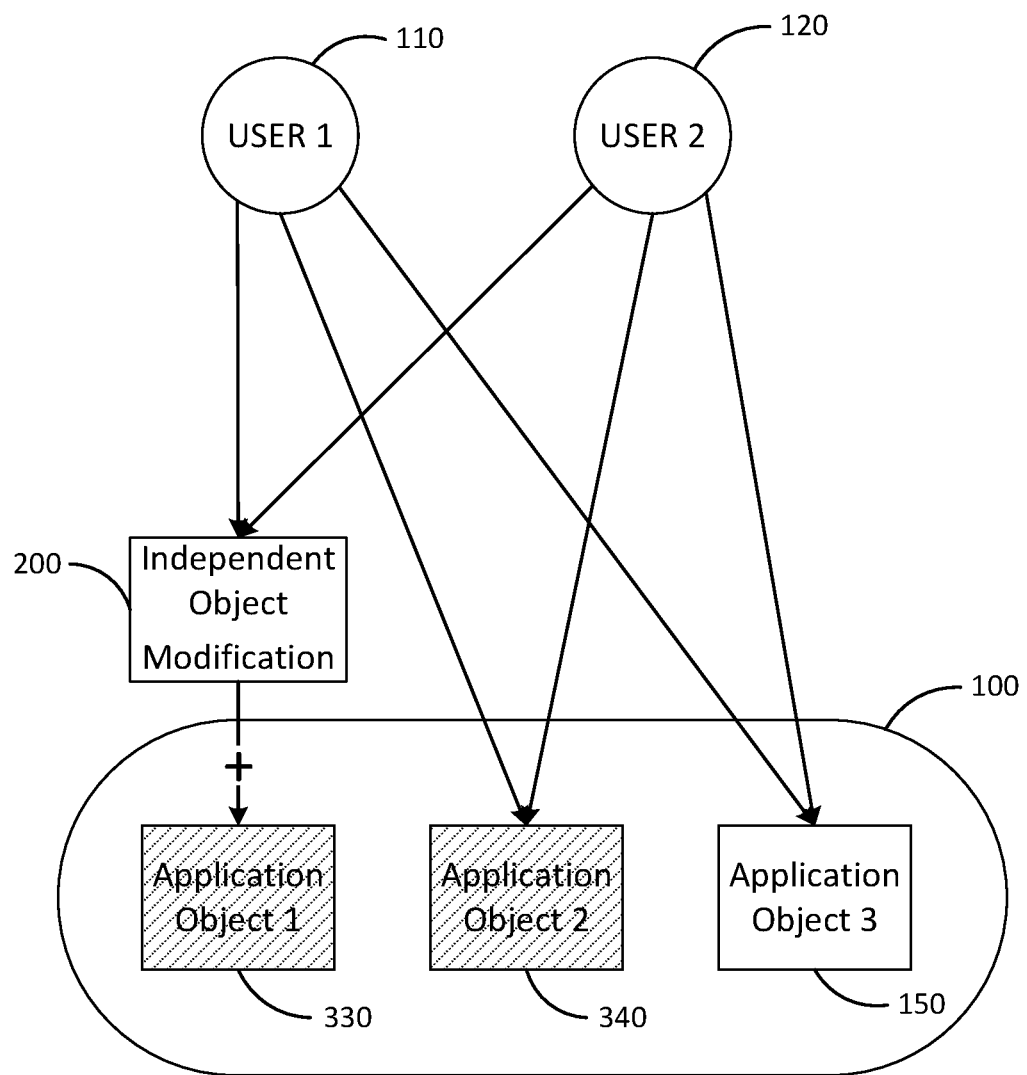
FIG. 3 illustrates, in block diagram form, the application of FIG. 2 as modified by a software vendor.

As illustrated in FIG. 3, application 100 is modified by the application provider or vendor to replace application objects 130 and 140 with updated application objects 330 and 340. Updated object 330 may remain modified by independent object modification 200 without changing independent object modification 200, users 110 and 120 may now execute application 100 with updated object 340 and independent object modification 200 instead of updated object 330, without having to change independent object modification 200.

In addition to the basic concept of allowing independent object modification in the system in place, embodiments may provide the ability to have multiple, independent sets of independent object modification definitions.

A modification group is a named collection of independent object modification definitions. A modification group may have any construct defined only a single time and may be defined as an modification of either the source definition or of some other modification, that there may be both a context and a set of construct definitions making up a modification group.

The modification group may be an identified entity, have properties, be referenced, manipulated, imported, exported, and included or excluded as a unit. Some customers may require the use of modification groups for organization and coordination purposes rather than having independent construct definitions.

A modification (or modification group) may be added to another modification (or modification group). This allows for multiple independent levels of modification. When looking at any definition, the bottom of the modification (or modification group) stack may be considered first, then each level (moving up the stack) in turn may be considered and added to all definitions of that construct below it. As a result, modifications are additive. As one skilled in the art will appreciate a higher level modification may be added to the construct such that a lower level modification is overridden.

Furthermore, any additional construct may be added at any level. At any level, any construct that is in any level below it may also be modified, including constructs not present in the layer below but present in layers below that, and constructs that are modified in the previous level.

Example embodiments allow different entities to provide customizations at different times and for different purposes without interfering with each other. One entity may have a set of customizations/extensions/enhancements to the application and may create a first independent object modification layer. Then, the end user might also want to customize the application by creating a second independent object modification layer. The base and each independent object modification layer may be independently modified by each entity. The user of the application may get the benefit of all the changes and each entity may work on the application and its customization of it separately without stepping on each other's changes.

Figure 4:
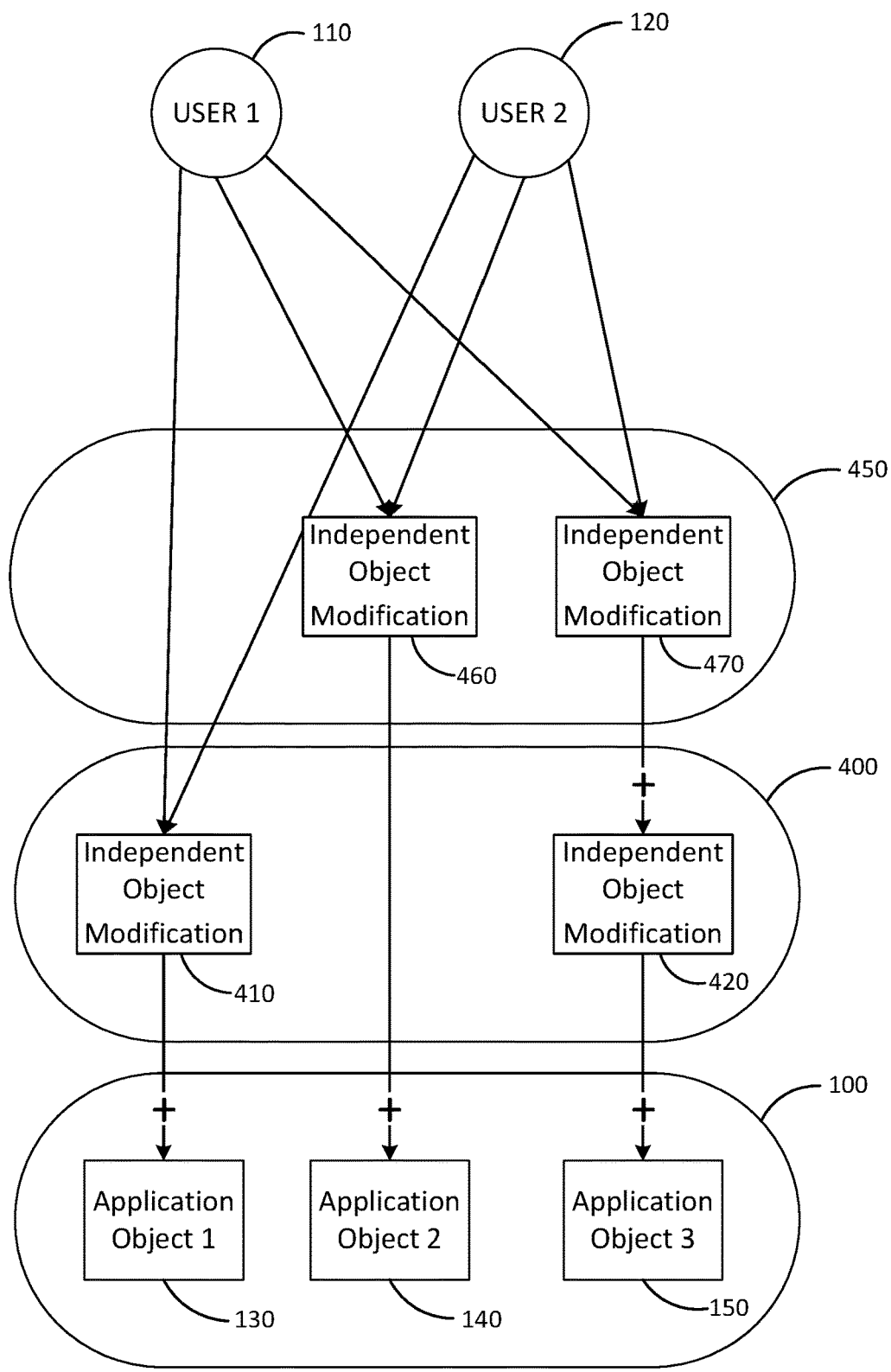
FIG. 4 illustrates, in block diagram form, an embodiment of an application modified by stacked groups of independent object modification(s).

FIG. 4 illustrates multiple stacked levels of independent object modifications. In this example, modification group or level 400 includes independent object modification 410 that modifies application object 130 and independent object modification 420 that modifies application object 150. Modification group or level 450 includes independent object modification 460, which modifies application object 140, and independent object modification 470, which modifies application object 150. Users 110 and 120 may then execute application 100 employing modified objects 410, 460, and 470. Independent object modification 420 in modification group or level 400 is itself modified by independent object modification 470 in modification group or level 450, and is therefore not directly accessed by either user 110 or 120 in this example.

Application objects 130, 140, and 150 are still available and application 100 and another user (not shown) may continue to execute application 100 without any of independent object modification 410, 420, 460, or 470. Alternately, another user (not shown) may choose to execute application 100 with only independent object modification level 400 and not modification group or level 450, thus employing independent object modifications 410 and 420. All of these users may use the same application instance, avoiding the need to manage and maintain multiple versions of the application 100.

In addition to hierarchical modification groups, some embodiments may provide for groups that are parallel to each other, allowing multiple modification groups that may modify the base definition or each independent object modification modifying the same modification group. Changes to any construct—the same ones or different ones—and additions of constructs can be made to either group. The two groups may be independent of each other.

When used, an end user may request or be assigned to a modification group and the appropriate independent object modification(s) may be applied. Thus, a customer may have a different set of constructs executing for different users of a single application.

Figure 5:
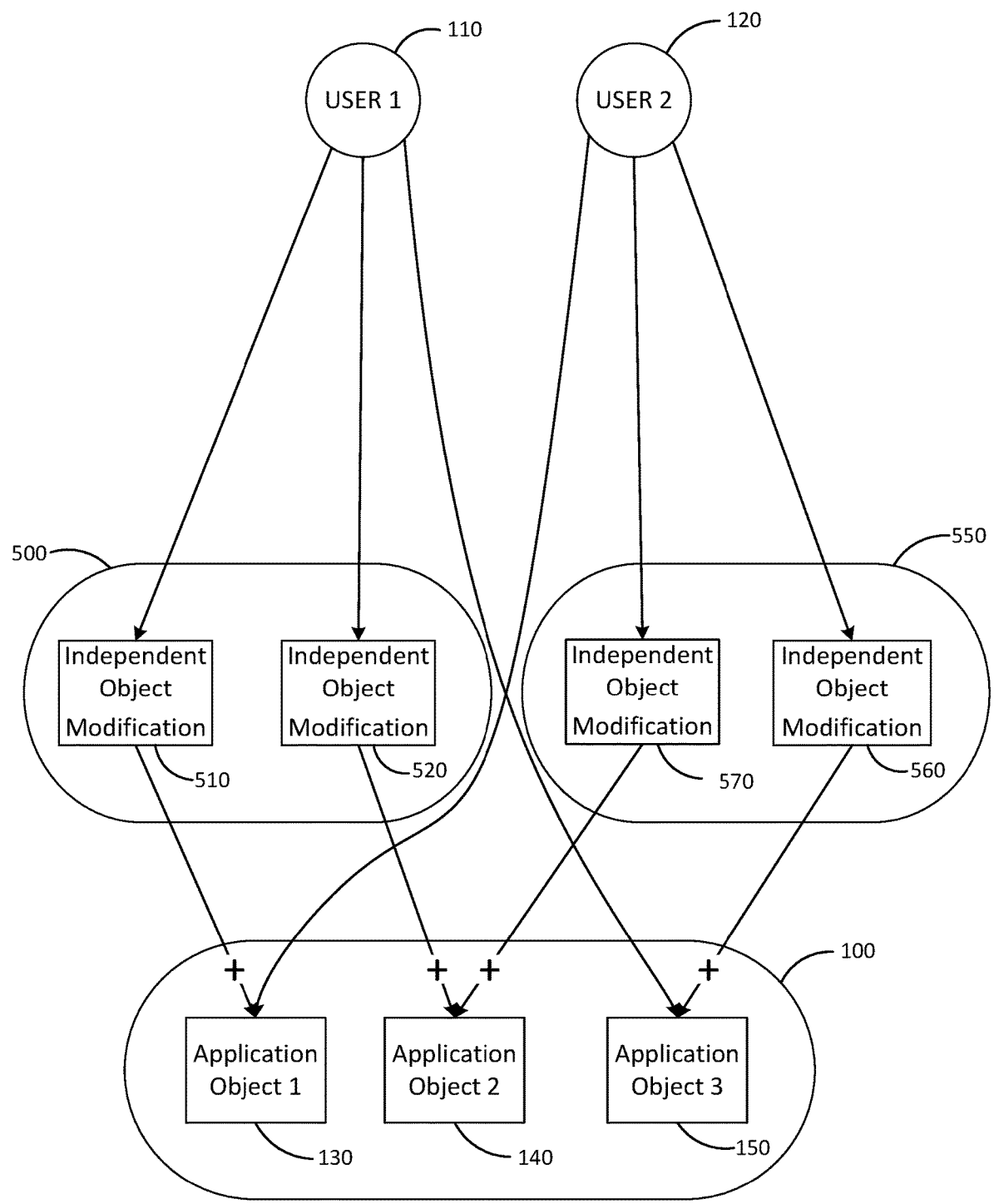
FIG. 5 illustrates, in block diagram form, an embodiment of an application modified by parallel groups of independent object modification.

FIG. 5 illustrates another embodiment of the disclosed techniques. In this embodiment, modification groups 500 and 550 may be applied in parallel, with user 110 executing application 100 with modification group 500 and user 120 executing application 100 with modification group 550. Modification group 500 includes independent object modifications 510 and 520, which modify application objects 130 and 140, respectively. Modification group 550 includes independent object modification 560, which modifies application object 150, and independent object modification 570, which modifies application object 140.

Using modification groups 500 and 550, user 110 may execute application 100 with independent object modifications 510 and 520, and base application object 150. User 120 may execute application 100 with base application objects 130 and independent object modifications 560 and 570. The same application 100 may also be available for execution without any modified objects or independent object modification(s). The illustrated modification groups 500 and 550 are illustrative and by way of example only and other groups and arrangement of independent object modification(s) within modification groups may be used. For example, although as illustrated in FIG. 5 modification groups 500 and 550 have no common elements, modification groups may be defined to overlap, so that some of the independent object modification(s) may be in multiple modification groups, while other independent object modification(s) may be in only a single modification group.

In one embodiment, security controls may be applied to independent object modification(s) and modification groups. For a modification group, security may be defined in terms of who can or cannot see or use the definitions within that modification group. When independent object modification(s) are being processed for a user, any modification group that the user does not have access to may be bypassed and only modification groups to which the user has access may be considered.

This allows the creation of hierarchies of modification groups where some layers are only available to some users without having to create parallel hierarchies with duplicated customizations in modification groups on each chain, allowing different definitions to be executed for different users within a single instance of the application.

Users may have limited access to independent object modification(s), using any desired conventional access control technique, such as permission groups or permission lists.

Figure 6:
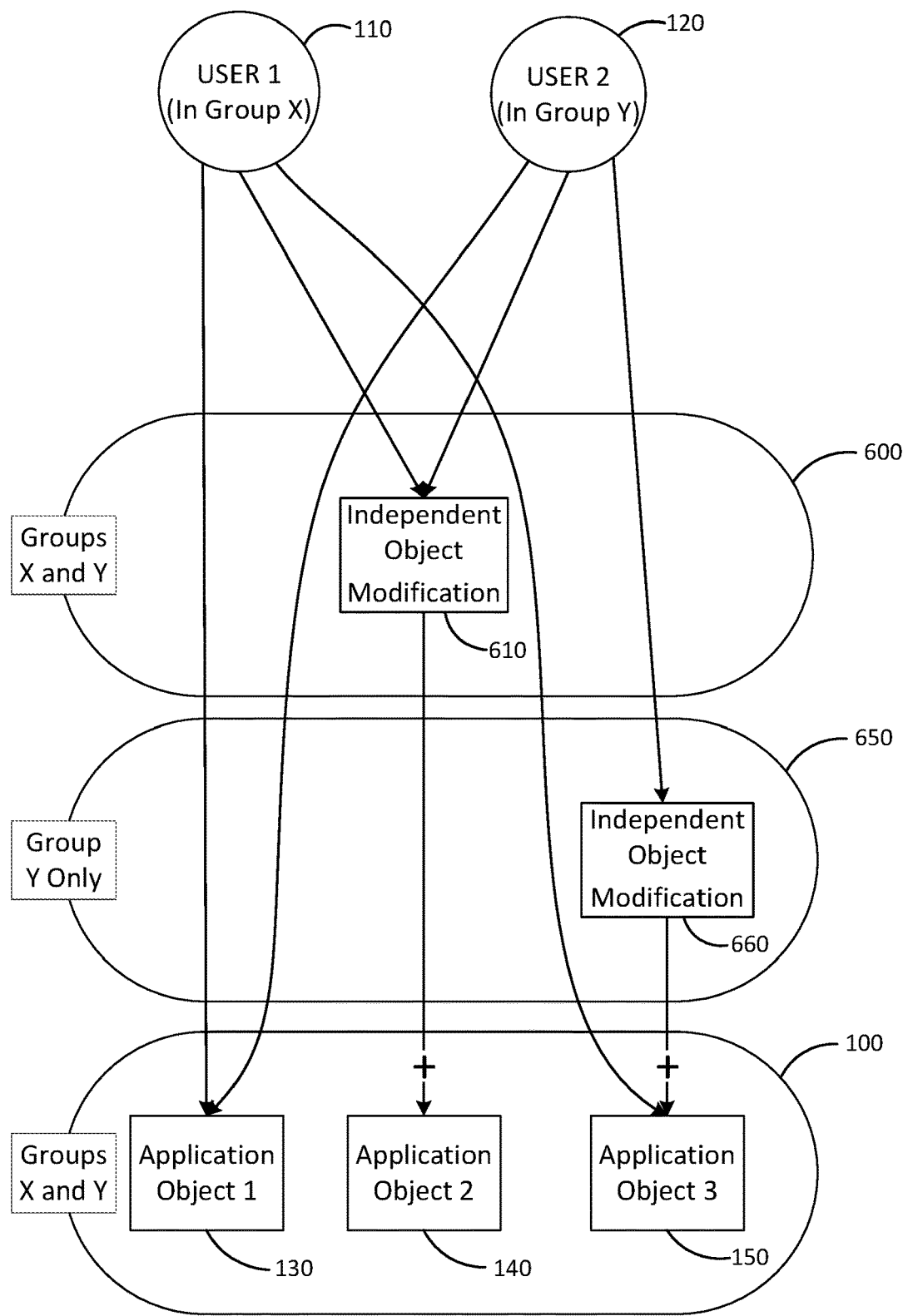
FIG. 6 illustrates, in block diagram form, an embodiment of an application modified by access-controlled modification groups.

FIG. 6 is a block diagram illustrating one embodiment in which permission groups are defined to control access. In this example, permission groups X and Y are defined, with user 110 a member of permission group X and user 120 a member of permission group Y. Modification group 600 may be defined as accessible by members of groups X and Y. Thus, independent object modification 610 in addition to application object 140 may be employed instead of the unmodified application object 140 when application 100 is executed by either user 110 or user 120.

In contrast, modification group 650 is defined as accessible only by members of group Y. Thus, when the user 110 executes application 100, application object 150 may be employed. Because user 120 is a member of group Y, when user 120 executes application 100, independent object modification 660 from modification group 650 in addition to application object 150 may be employed instead of the unmodified application object 150. Neither modification group 600 nor modification group 650 includes a modification of application object 130, so in this example application object 130 is employed when either user 110 or user 120 executes application 100.

Returning to FIG. 4, if modification group 450 were assigned to a permissions group of which user 120 is a member and user 110 is not a member, and modification group of 400 were assigned to a permissions group of which user 110 is a member and not user 120, then the behavior described above would change. User 110 may execute application 100 by employing independent object modifications 410 in addition to application object 130 and 420 in addition to application object 150, as well as application object 140. User 120 may execute application object 100 by employing independent object modifications 460 in addition to application object 140 and 470 in addition to application object 150, as well as application object 130. Thus, the permission-neutral stacking of independent object modification(s) illustrated in FIG. 4 may be changed by using access control mechanisms such as permission groups.

Figure 7:
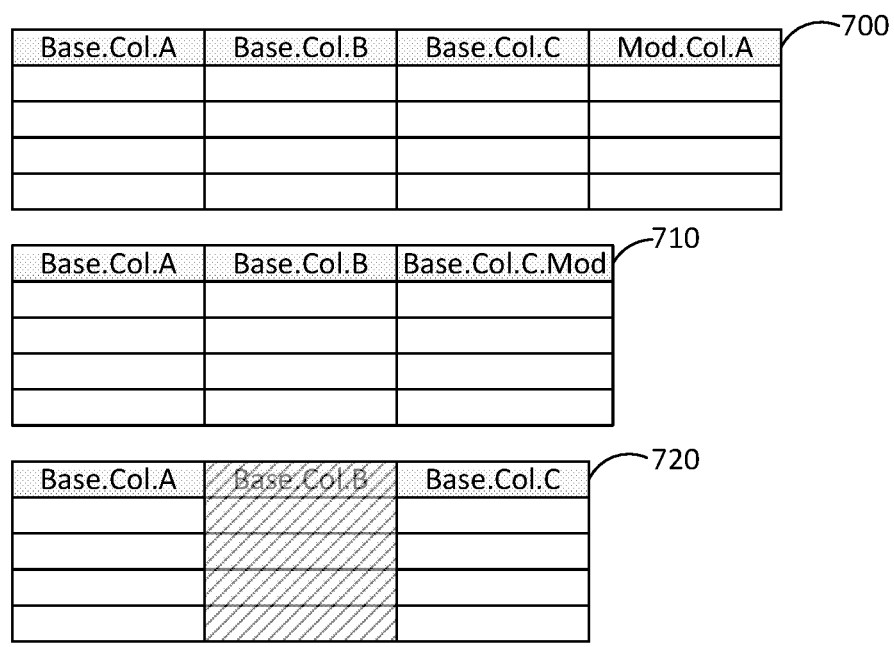
FIG. 7 illustrates, in table form, an embodiment of a modified database table.

FIG. 7 illustrates a table illustrating example embodiments in which a database table is modified. As shown in FIG. 7 columns may be modified as described above. An original table includes three columns. The three columns are Base.Col.A, Base.Col.B, and Base.Col.C. In the first example, the modified table 700 is modified by adding column Mod.Col.A. For example, referring to FIG. 2, the application object 130 may be the original table including columns Base.Col.A, Base.Col.B, and Base.Col.C. The independent object modification 200 may be configured to add column Mod.Col.A to the original table. According to example embodiments, the original table is not replaced and only modified. Therefore, if (as shown in FIG. 3) the original table is changed (e.g., a fourth column is added or the type of Base.Col.A is changed) via an upgrade or patch, the modified table also includes the change without changing independent object modification 200.

In the second example, the modified table 710 is modified by changing column Base.Col.C shown as Base.Col.C.Mod. For example, in the original table Base.Col.C may be of type 'Char(32)'. The modification may change the type to 'Text', 'Char(64)', 'Blob', and the like. For example, referring to FIG. 2, the application object 130 may be the original table including columns Base.Col.A, Base.Col.B, and Base.Col.C. The independent object modification 200 may be configured to modify the type associated with column Base.Col.C in the original table. According to example embodiments, the original table is not replaced and only modified. Therefore, if (as shown in FIG. 3) the original table is changed (e.g., a fourth column is added or the type of Base.Col.A is changed) via an upgrade or patch, the modified table also includes the change without changing independent object modification 200. As on skilled in the art will appreciate, if Base.Col.C is removed as part of the upgrade or patch or the upgrade or patch includes the modification from the independent object modification 200, then the independent object modification 200 is in effect a no operation (e.g., not done because the change already exists).

In the third example, the modified table 720 is modified by removing or limiting the access to column Base.Col.B. For example, in the original table permissions associated with Base.Col.B may be set such that a particular group of users can not access Base.Col.B. For example, referring to FIG. 6, the application object 150 may be the original table including columns Base.Col.A, Base.Col.B, and Base.Col.C. The independent object modification 660 may be configured to modify the permissions associated with column Base.Col.B in the original table such that user 110 may not access Base.Col.B. According to example embodiments, the original table is not replaced and only modified. Therefore, if (as shown in FIG. 3) the original table is changed (e.g., a fourth column is added or the type of Base.Col.A is changed) via an upgrade or patch, the modified table also includes the change without changing independent object modification 660. As on skilled in the art will appreciate, if Base.Col.B is removed as part of the upgrade or patch or the upgrade or patch includes the modification from the independent object modification 660, then the independent object modification 660 is in effect a no operation (e.g., not done because the change already exists).

Figure 8:
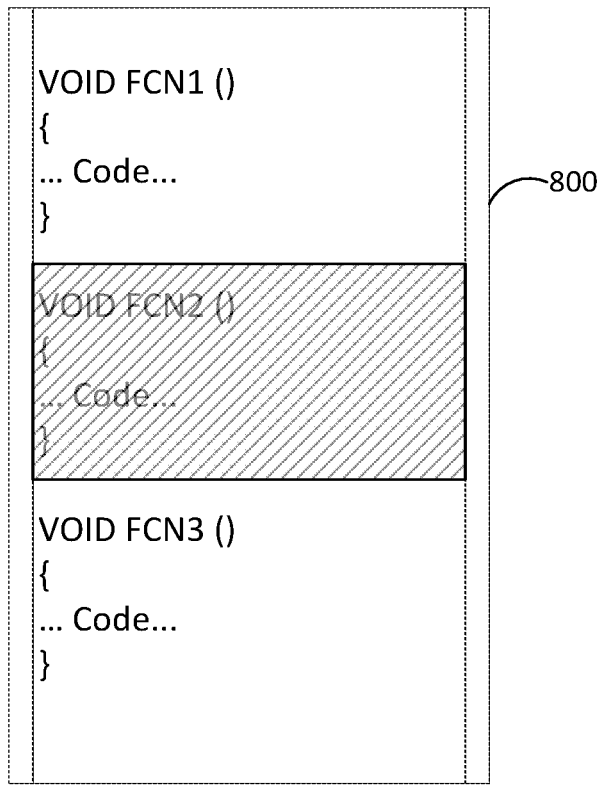
FIG. 8 illustrates, in block diagram form, an embodiment in which source code for a function is modified.

In another example embodiment, software code, such as callable functions of a program, may be modified. FIG. 8 illustrates a program 800 in which base functions FCN1, FCN2, and FCN3 may be modified. Modified functions may replace base functions, remove base functions, change permissions for executing base functions and the like. The modified functions may allow users to execute the modified function instead of the base function. In one embodiment, in which program 800 is interpreted, an interpretation environment may replace the code for function FCN1 while maintaining the remainder of the functions. In one embodiment, this modification may be performed prior to execution of the program 800. The resultant program may be interpreted by the interpretation environment. In other embodiments, the interpretation environment may incorporate runtime control structures into the program 800 as part of the modification process, to allow the interpretation environment to decide to execute either base function FCN1 or the modified function at each invocation of the function.

In another example, permissions may be added such that one or more of the functions are not accessible by a user or group of users. For example, as shown in FIG. 8, FCN2 is greyed out in order to show this access limitation. For example, referring to FIG. 6, the application object 150 may be the original software code including base functions FCN1, FCN2, and FCN3. The independent object modification 660 may be configured to modify the permissions associated with column FCN2 such that user 110 may not execute FCN2. According to example embodiments, the original software code is not replaced and only modified. Therefore, if (as shown in FIG. 3) the original software code is changed (e.g., a fourth function is added or one of the original functions is changed) via an upgrade or patch, the modified software code also includes the change without changing independent object modification 660. As on skilled in the art will appreciate, if FCN2 is removed as part of the upgrade or patch or the upgrade or patch includes the modification from the independent object modification 660, then the independent object modification 660 is in effect a no operation (e.g., not done because the change already exists).

In a compiled language embodiment, an independent object modification generation tool may be employed to incorporate runtime control structures to allow the generation of a single executable that may be executed by both users 110 and 120 with different independent object modification(s), as illustrated by FIGS. 2-6 above. These control structures may be simple if-then-else or case statement type control structures, selecting the code segment to be executed for the invoking user, or other control structures known to the art for selecting which of multiple choices to execute. By compiling these control structures and the modified code segments into the executable, a single executable may be generated that decides at runtime which independent object modification should be executed.

In one embodiment, the independent object modification(s) may be stored in a database, together with information regarding modification groups, access control information, and information regarding the application object to be modified by the independent object modification(s). An interpretation environment or compiler may then query the database and determine which, if any, of the independent object modification should be used at runtime.

Figures 9A, 9B:
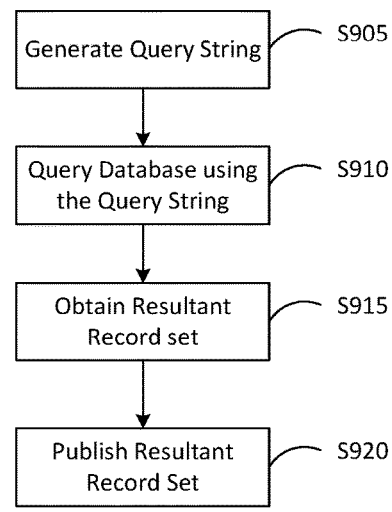
FIG. 9A illustrates an example configuration file and FIG. 9B illustrates an example method for accessing the database to retrieve the configuration file(s).

The stored independent object modification(s), information regarding modification groups, access control information, and information regarding the application object to be modified by the independent object modification(s) together may form a configuration file. FIG. 9A illustrates an example configuration file and FIG. 9B illustrates an example method for accessing the database to retrieve the configuration file(s).

As shown in FIG. 9A, the configuration file 900 may include columns including Key, Application_ID, Object_ID, Object_Modification_ID, Group, Access, and Information. Information may include information regarding the application object, rules associated with the independent object modification(s) (e.g., time control, location, context and the like), code, modification parameters and the like. Alternatively, and/or in addition to, each of the information context may have an associated column in the configuration file 900.

As one skilled in the art will appreciate, the method steps described with regard to FIG. 9B may be executed as software code stored in a memory associated with system 1000 and/or system 1100 and executed by a processor (e.g., the processor unit (PU) 1020) associated with system 1000.

For example, the method steps may be performed by an application-specific integrated circuit, or ASIC. Although the steps described below are described as being executed by a processor (e.g., the processor unit (PU) 1020), the steps are not necessarily executed by a same processor. In other words, at least one processor may execute the steps described below with regard to FIG. 9B.

As shown in FIG. 9B, in step S905 the processor generates a query string. For example, the query string may include a search tag on the Application_ID. In step S910 the processor queries the database using the query string. In step S915 the processor obtains the resultant record set. For example, the result of executing the query including the query string returns the record set for the entry including the searched for Application_ID. In step S920 the processor publishes the resultant record set. For example, the processor may make the record set available to other functions in the system (e.g., systems 1000 and 1100).

In one embodiment, independent object modification(s) may be stored or kept in memory as linked lists of independent object modification(s), allowing traversal of the list of independent object modification(s) in the independent object modification(s) or hierarchy to determine the appropriate modified (or original) object to use for a given user.

Although described above in terms of callable functions, any program code may be modified in various embodiments, including as little as a single line of code. In some embodiments, the modification technique modifies source code, which may be interpreted or compiled as desired. In other embodiments, the independent object modification(s) may be object or executable code stored in libraries that are dynamically included at runtime or by statically linking the modified routines into an executable with suitable control structures for selecting which routine to execute at runtime.

Figure 10:
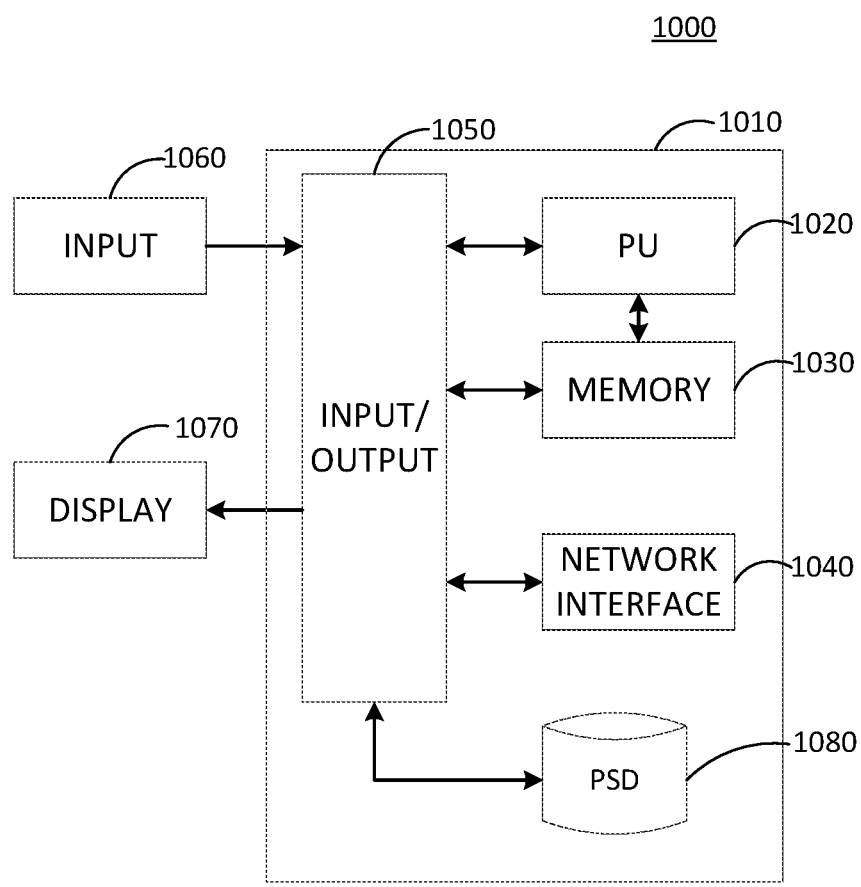
FIG. 10 illustrates, in block diagram form, an embodiment of a computer system.

Referring now to FIG. 10, an example computer 1000 for use in providing a transparent process context is illustrated in block diagram form. Example computer 1000 includes a system unit 1010 which may be optionally connected to an input device or system 1060 (e.g., keyboard, mouse, touch screen, etc.) and display 1070. A program storage device (PSD) 1080 (sometimes referred to as a hard disc) is included with the system unit 1010. Also included with system unit 1010 is a network interface 1040 for communication via a network with other computing and corporate infrastructure devices (not shown). Network interface 1040 may be included within system unit 1010 or be external to system unit 1010. In either case, system unit 1010 may be communicatively coupled to network interface 1040. Program storage device 1080 represents any form of non-volatile storage including, but not limited to, all forms of optical and magnetic, including solid-state, storage elements, including removable media, and may be included within system unit 1010 or be external to system unit 1010. Program storage device 1080 may be used for storage of software to control system unit 1010, data for use by the computer 1000, or both.

System unit 1010 may be programmed to perform methods in accordance with this disclosure. System unit 1010 includes a processor unit (PU) 1020, input-output (I/O) interface 1050 and memory 1030. Processing unit 1020 may include any programmable controller device including, for example, one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 1030 may include one or more memory modules and comprise random access memory (RAM), read only memory (ROM), programmable read only memory (PROM), programmable read-write memory, and solid-state memory. One of ordinary skill in the art will also recognize that PU 1020 may also include some internal memory including, for example, cache memory.

Figure 11:
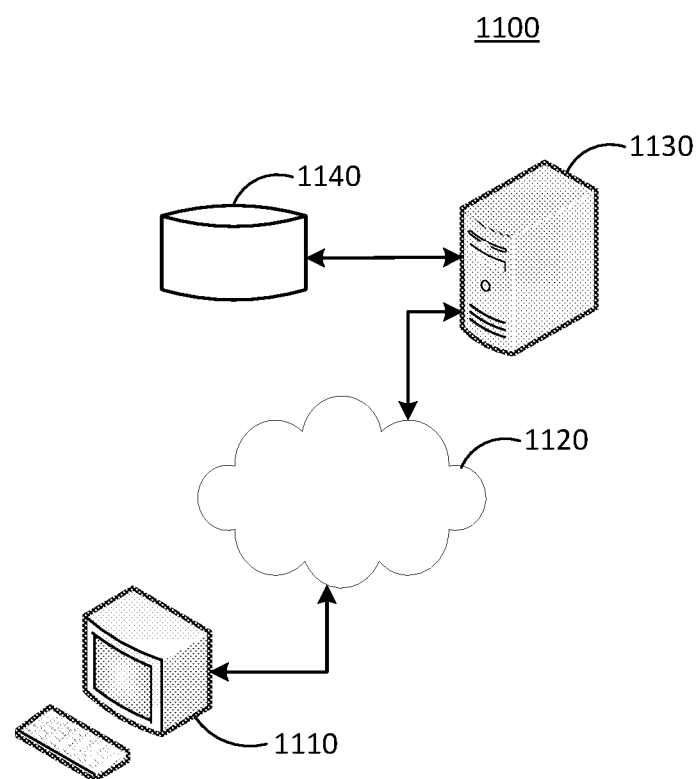
FIG. 11 illustrates, in block diagram form, an embodiment of a system for applying independent object modification to application objects.

FIG. 11 illustrates a system 1100 for providing modified applications according to one embodiment. An application may be executed on the workstation 1110. A dictionary of independent object modification(s) and application objects may be stored in a data store 1140 that is managed by a server 1130. The server 1130 and workstation 1110 typically are connected by a network 1120, but may communicate across any connection type known to the art, using any convenient or desired communications protocol. In one embodiment, a request to execute the application on the workstation 1110 invokes a runtime environment that communicates with the server 1130 to query the data store 1140 for independent object modification(s) to be applied when executing the application for the requester. In one embodiment, the independent object modification(s) are present in the application and the server 1130 may supply information for runtime control structures in the application to determine which independent object modification(s) to execute on the workstation 1110. In another embodiment, the independent object modification(s) may be stored in the data store 1140 and supplied by the server 1130 as needed to the workstation 1110 for execution at the proper point of the application.

In one embodiment, the data store 1140 provides a dictionary objects, including original and independent object modification(s). Each independent object modification definition includes information to link the object with the object which is modified. Thus, in the scenario illustrated in FIG. 4, independent object modification 410 may be defined in the dictionary as modifying original application object 130, and as part of modification group of 400, while independent object modification 470 is defined as being in modification group 450 and modifying independent object modification 420, which in turn is defined as modifying original application object 150. When a user requests execution of the application 100 on either workstation 1110 or the server 1130, in one embodiment an interpretive environment may build and execute an instance of the application 100 for that user from its included objects, applying the chains of independent object modification(s) to determine which objects to include for execution.

Figure 12:
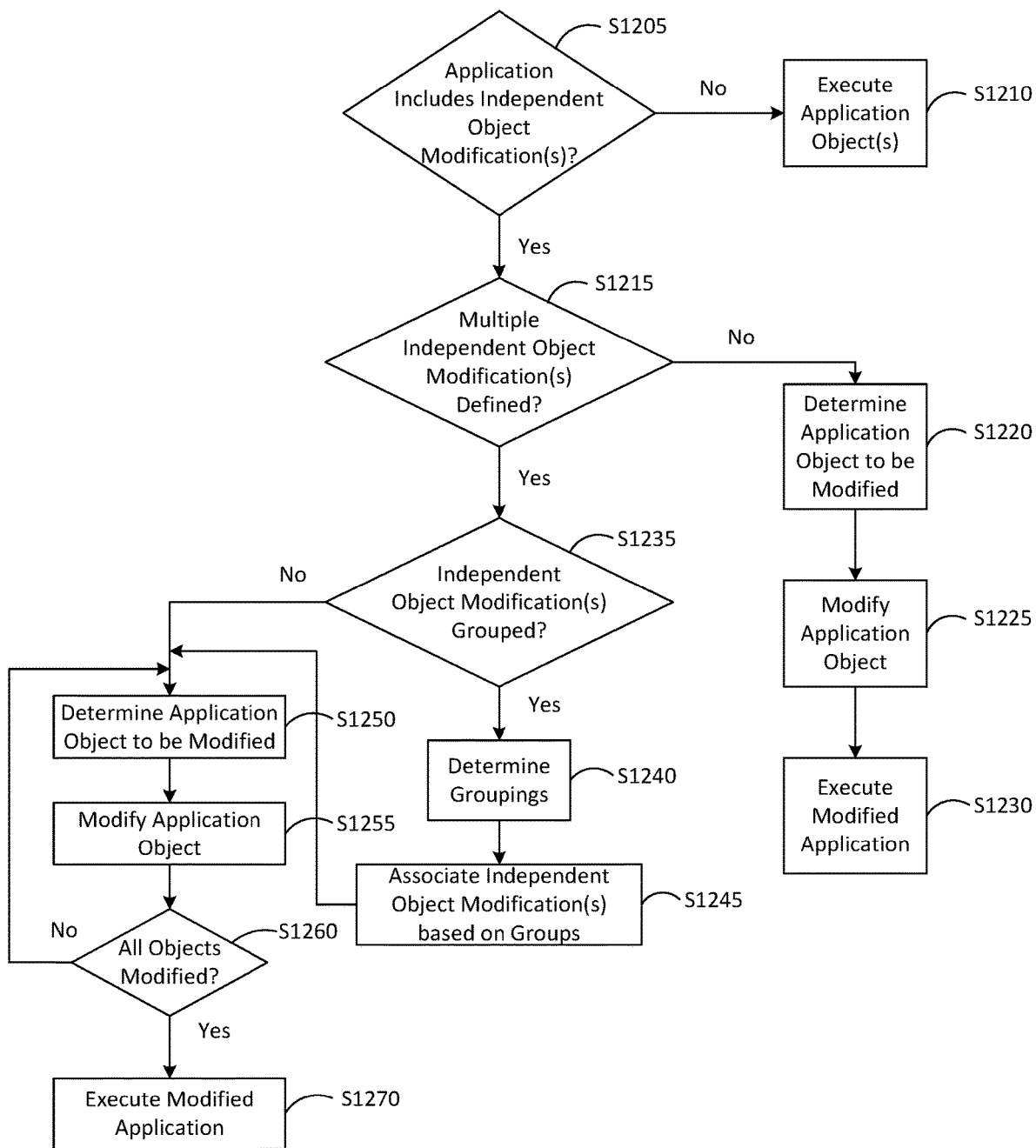
FIG. 12 is a flowchart illustrating a method for applying an independent object modification according to an example embodiment.

FIG. 12 is a flowchart illustrating a method for applying an independent object modification according to an example embodiment. As one skilled in the art will appreciate, the method steps described with regard to FIG. 12 may be executed as software code stored in a memory associated with system 1000 and/or system 1100 and executed by a processor (e.g., the processor unit (PU) 1020) associated with system 1000.

For example, the method steps may be performed by an application-specific integrated circuit, or ASIC. Although the steps described below are described as being executed by a processor (e.g., the processor unit (PU) 1020), the steps are not necessarily executed by a same processor. In other words, at least one processor may execute the steps described below with regard to FIG. 12.

As shown in FIG. 12, in step S1205 the processor determines if an application includes an independent object modification(s). If the application does not include an independent object modification(s) processing moves to step S1210. Otherwise, processing continues to step S1215. For example, as discussed above, a database may include references to applications and application objects that have associated independent object modification(s). A query of the database using an identification for the application may return a record set. If there are zero (0) records in the record set, the application may not include any independent object modification(s). If there are one or more records in the record set, the application may include independent object modification(s).

In step S1210 the processor executes application objects. For example the processor executes the application object (or entire application) without any modifications. For example the processor executes the application object as designed by the vendor.

In step S1215 the processor determines if multiple independent object modification(s) are defined. If multiple application independent object modification(s) are not defined, processing moves to step S1220. Otherwise, processing continues to step S1235. For example, as discussed above, a database may include references to applications and application objects that have associated independent object modification(s). A query of the database using an identification for the application may return a record set. If there is more than one record in the record set for the application, the application may include multiple independent object modification definitions. If there is only one record in the record set for the application, the application may not include multiple independent object modification definitions.

In step S1220 the processor determines the application object to be modified. For example, if the application runs in a compiled environment, during a compile execution (e.g., upon initial install or upon installing an upgrade or patch), the processor may read information from the record set. The information may include an identification for the object to be modified. The processor may determine the application object to be modified based on the identification for the object to be modified. In other words, the processor may select the object from the record set.

Further, if the application runs in an interpreted environment, determining the object to be modified may also be based on whether or not the object will be executed during a current execution of the application. For example, in an interpreted environment the processor may select the object from the record set. However, if the object will not be executed during a current execution of the application, no object may be selected in order to, for example, conserve processing resources.

In step S1225 the processor modifies the application object. For example, the processor may add or subtract an element in the application object. The processor may add a column to a database table object (as described above with regard to FIG. 7). The processor may restrict access (e.g., remove) a column from a database table object (as described above with regard to FIG. 7) based on a security group associated with a user (e.g., user 110). For example, the processor may modify a characteristic of element from the application object. The processor may change a type of a column in a database table object, change a characteristic of a webpage or form element (e.g, textbox or dropdown list), change a security level of a webpage, form, webpage element or form element, and/or the like. As discussed above and according to example embodiments, the original object is not replaced. By contrast, the resultant modified object only modifies what is to be changed (e.g., adds to) the original object.

In step S1230 the processor executes the modified application. For example the processor executes the application object (or entire application) with the modified object.

In step S1235 the processor determines if independent object modification(s) are grouped. If independent object modification(s) are grouped, processing continues to step S1240. Otherwise, processing continues at step S1250. For example, as discussed above, independent object modification(s) based on, for example, security requirements. A query of the database using an identification for the application may return a record set including the groupings.

In step S1240 the processor determines the groupings. For example, the modification groups may include parallel independent object modification(s). These modification groups may be arranged in levels such that each level includes independent object modification(s) that may modify lower level independent object modification(s). A lower level is a level arranged between the interested level and the application object level.

These modification groups may include serial independent object modification(s). The serial grouping may be "summed" (e.g., cumulative) from a higher level to a lower level of the group. For example, the group of serial independent object modification(s) may be evaluated from the lowest level to the highest level such that each subsequent higher level modification is added to the cumulative lower levels. For example, a higher level modification may override a lower level modification. As one skilled in the art will appreciate, a similar serial structure may be similarly evaluated from a higher level to a lower level.

In step S1245 the processor associates independent object modification(s) based on the groups. For example, the processor may group the independent object modification(s) in respective serial and parallel groupings as discussed above.

In step S1250 the processor determines the application object to be modified. For example, if the application runs in a compiled environment, during a compile execution (e.g., upon initial install or upon installing an upgrade or patch), the processor may read information from the record set. The information may include an identification for the object to be modified. The processor may determine the application object to be modified based on the identification for the object to be modified. In other words, the processor may select the object from the record set.

Further, if the application runs in an interpreted environment, determining the object to be modified may also be based on whether or not the object will be executed during a current execution of the application. For example, in an interpreted environment the processor may select the object from the record set. However, if the object will not be executed during a current execution of the application, no object may be selected in order to, for example, conserve processing resources.

In step S1255 the processor modifies the object. For example, the processor may add or subtract an element in the application object. The processor may add a column to a database table object (as described above with regard to FIG. 7). The processor may restrict access (e.g., remove) a column from a database table object (as described above with regard to FIG. 7) based on a security group associated with a user (e.g., user 110). For example, the processor may modify a characteristic of element from the application object. The processor may change a type of a column in a database table object, change a characteristic of a webpage or form element (e.g, textbox or dropdown list), change a security level of a webpage, form, webpage element or form element, and/or the like. As discussed above and according to example embodiments, the original object is not replaced. By contrast, the resultant modified object only modifies what is to be changed (e.g., adds to) the original object.

In step S1260 the processor determines if all application objects have been modified. If all application objects have been modified, processing continues to step S1265. Otherwise processing returns to step S1250. For example, the aforementioned record set may include more than one object with an associated independent object modification(s). The processor may loop through each of the records until all have been modified.

In step S1265 the processor executes the modified application. For example the processor executes the application object (or entire application) with the modified object.

Figure 13:
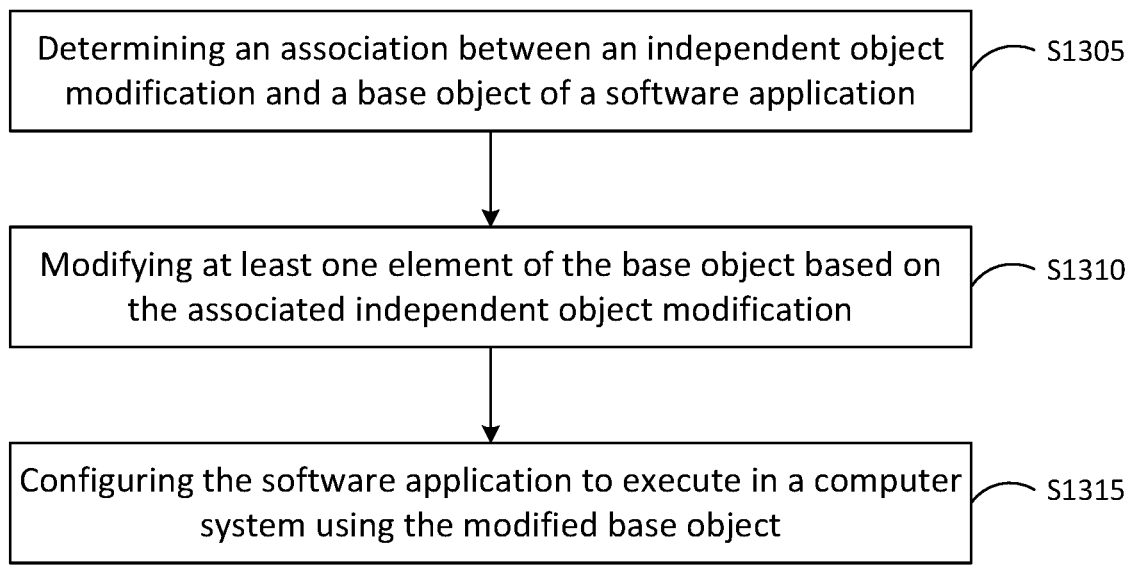
FIG. 13 is a flowchart illustrating a method for applying an independent object modification according to an example embodiment.

FIG. 13 is a flowchart illustrating a method for applying an independent object modification according to an example embodiment. As one skilled in the art will appreciate, the method steps described with regard to FIG. 13 may be executed as software code stored in a memory associated with system 1000 and/or system 1100 and executed by a processor (e.g., the processor unit (PU) 1020) associated with system 1000.

For example, the method steps may be performed by an application-specific integrated circuit, or ASIC. Although the steps described below are described as being executed by a processor (e.g., the processor unit (PU) 1020), the steps are not necessarily executed by a same processor. In other words, at least one processor may execute the steps described below with regard to FIG. 13.

As shown in FIG. 13, in step S1305 a processor determines an association between an independent object modification and a base object of a software application. For example, as discussed above, the processor may query a database to find the associations. The database may store record sets with information about the association. The information may include rules for modifying the object. The record sets may be configuration files.

In step S1310 the processor modifies at least one element of the base object based on the associated independent object modification. For example, the processor may modify the object based on the rules. For example, as discussed above, the modification may modify a characteristic, an attribute and/or a function associated with the object. The object may include an associated permission for use (access) and/or modification.

In step S1315 the processor configuring the software application to execute in a computer system using the modified base object. For example, the processor may execute the software application including the modification. For example, the processor may use the modification to enhance the object. However, the processor may not replace the object with the modified object.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method for maintaining modifications after an upgrade of a software application installed on a computer system, the software application including a plurality of objects, each object including one or more elements, an element of the one or more elements having an original definition, the method comprising:

receiving an object modification including a modified definition of a software application object of the plurality of objects, the modified definition including at least one additive or subtractive change to the original definition;

storing the object modification separately from the software application object with a link to the software application object within the software application;

in response to a request for a first execution of the software application that includes executing the software application object, accessing the link to identify the object modification;

performing the first execution of the software application by performing a first combination of the software application object and the object modification accessed using the link, including applying the modified definition to a first execution path of the software application while suppressing the original definition in the first execution path to make the at least one additive or subtractive change to the software application object during the first execution;

receiving, during the upgrade to the software application, an upgrade to the software application object to obtain an upgraded software application object;

in response to a request for a second execution of the software application that includes executing the upgraded software application object, accessing the link to identify the object modification; and performing the second execution of the software application by performing a second combination of the upgraded software application object and the object modification accessed using the link, including applying the modified definition to a second execution path of the software application to make the additive or subtractive change to the upgraded software application object during the second execution.

2. The method of claim 1 further comprising, implementing the link using an association between the object modification and the software application object in an independent configuration file.

3. The method of claim 2, wherein the independent configuration file is a record set in a database, and wherein determining the association between the object modification and the software application object includes querying the database based on at least one of the software application and the software application object.

4. The method of claim 1, wherein the additive or subtractive change includes one of adding a permission to the software application object, removing a permission from the software application object and changing a permission of the software application object.

5. The method of claim 1, wherein performing the first execution includes:
determining a permission associated with a user of the software application,
determining a permission list associated with the object modification, and
executing the first combination if the user is in the permission list.

6. The method of claim 1, wherein performing the first execution includes:
determining a list of characteristics associated with the software application object,
determining a characteristic modification based on the object modification, and
modifying at least one of the characteristics in the list of characteristics with the characteristic modification.

7. The method of claim 1, wherein performing the first execution includes:
determining a list of characteristics associated with the software application object,
determining a characteristic modification based on the object modification,
determining a time period constraint associated with the characteristic modification, and
executing the first combination including modifying at least one of the characteristics in the list of characteristics with the characteristic modification based on the time period constraint.

8. The method of claim 1, further comprising:
determining if there are a plurality of object modifications associated with the software application object;
determining a grouping associated with the plurality of object modifications associated with the software application object; and
executing the first combination based on the grouping associated with the plurality of object modifications.

9. The method of claim 8, wherein the determining the grouping associated with the plurality of object modifications includes
determining if the grouping includes at least one of a parallel group and a sequential group;
wherein, if the grouping includes a sequential group, the executing the first combination includes a hierarchical modification of the element of the software application object, and
wherein, if the grouping includes a parallel group, the executing the first combination includes modifying the element of the software application object by a plurality of object modifications at a same priority level.

10. The method of claim 1, wherein
a first act of configuring the software application to execute the first combination is performed responsive to a request to execute the software application by a first user having a first permission, and
a second act of configuring the software application to execute in the computer system using the software application object and without using the modified element of the object modification in combination therewith is performed responsive to a request to execute the software application by a second user having a second permission.

11. The method of claim 10, further comprising:
executing the software application in the computer system using a different execution path for each of the first user and the second user based on the first permission, the second permission, and a permission associated with the object modification.

12. A non-transitory computer readable medium for maintaining modifications after an upgrade of a software application installed on a computer system, the software application including a plurality of objects, each object including one or more elements, an element of the one or more elements having an original definition, the medium including code segments that when executed by a processor cause the processor to:
receive an object modification including a modified definition of a software application object of the plurality of objects, the modified definition including at least one additive or subtractive change to the original definition;
store the object modification separately from the software application object with a link to the software application object within the software application;
in response to a request for a first execution of the software application that includes executing the software application object, access the link to identify the object modification;
perform the first execution of the software application by performing a first combination of the software application object and the object modification accessed using the link, including applying the modified definition to a first execution path of the software application while suppressing the original definition in the first execution path to make the at least one additive or subtractive change to the software application object during the first execution;
receive, during the upgrade to the software application, an upgrade to the software application object to obtain an upgraded software application object;
in response to a request for a second execution of the software application that includes executing the upgraded software application object, accessing the link to identify the object modification; and
perform the second execution of the software application by performing a second combination of the upgraded software application object and the object modification accessed using the link, including applying the modified definition to
a second execution path of the software application to make the additive or subtractive change to the upgraded software application object during the second execution.

13. The non-transitory computer readable medium of claim 12, wherein
the link is implemented using an association between the object modification and the software application object is stored in an independent configuration file,
the independent configuration file is a record set in a database, and
the processor is configured to determine the association between the object modification and the software application object by querying the database based on at least one of the software application and the software application object.

14. The non-transitory computer readable medium of claim 12, wherein performing the first execution includes:
  determining a permission associated with a user of the software application,
  determining a permission list associated with the object modification, and
  executing the first combination if the user is in the permission list.

15. The non-transitory computer readable medium of claim 12, wherein the code segments further cause the processor to:
  determine if there are a plurality of object modifications associated with the software application object;
  determine a grouping associated with the plurality of object modifications associated with the software application object; and
  execute the first combination based on the grouping associated with the plurality of object modifications.

16. The non-transitory computer readable medium of claim 15, wherein determining the grouping associated with the plurality of object modifications, includes
  determining if the grouping includes at least one of a parallel group and a sequential group,
  wherein, if the grouping includes a sequential group, executing the first combination includes a hierarchical modification of the element of the software application object, and
  wherein, if the grouping includes a parallel group, executing the first combination includes modifying the element of the software application object by a plurality of object modifications at a same priority level.

17. The non-transitory computer readable medium of claim 12, wherein
  a first act of configuring the software application to execute the first combination is performed responsive to a request to execute the software application by a first user having a first permission,
  a second act of configuring the software application to execute in the computer system using the software application object and without using the modified element of the object modification in combination therewith is performed responsive to a request to execute the software application by a second user having a second permission, and
  the processor is further configured to execute the software application in the computer system in a different execution path for each of the first user and the second user based on the first permission, the second permission, and a permission associated with the object modification.

18. The method of claim 1, further comprising performing a third execution including receiving a selection from between the software application object and the upgraded software application object, and applying the selection to a third execution path of the software application to execute a third combination of the object modification and the selection, and further wherein receiving the selection comprises receiving the selection based on at least one of: a user permission level of a user of the software application, a time constraint, a location constraint, or a context constraint.

19. The non-transitory computer readable medium of claim 12, wherein the instructions are further configured to cause the processor to perform a third execution including receiving a selection from between the software application object and the upgraded software application object, and applying the selection to a third execution path of the software application to execute a third combination of the object modification and the selection, and further wherein receiving the selection comprises receiving the selection based on at least one of: a user permission level of a user of the software application, a time constraint, a location constraint, or a context constraint.

* * * * *